No. 702,766. Patented June 17, 1902.
J. B. BARTHOLOMEW.
PNEUMATIC STACKER.
(Application filed Nov. 19, 1898. Renewed Feb. 14, 1902.)
(No Model.) 5 Sheets—Sheet 1.
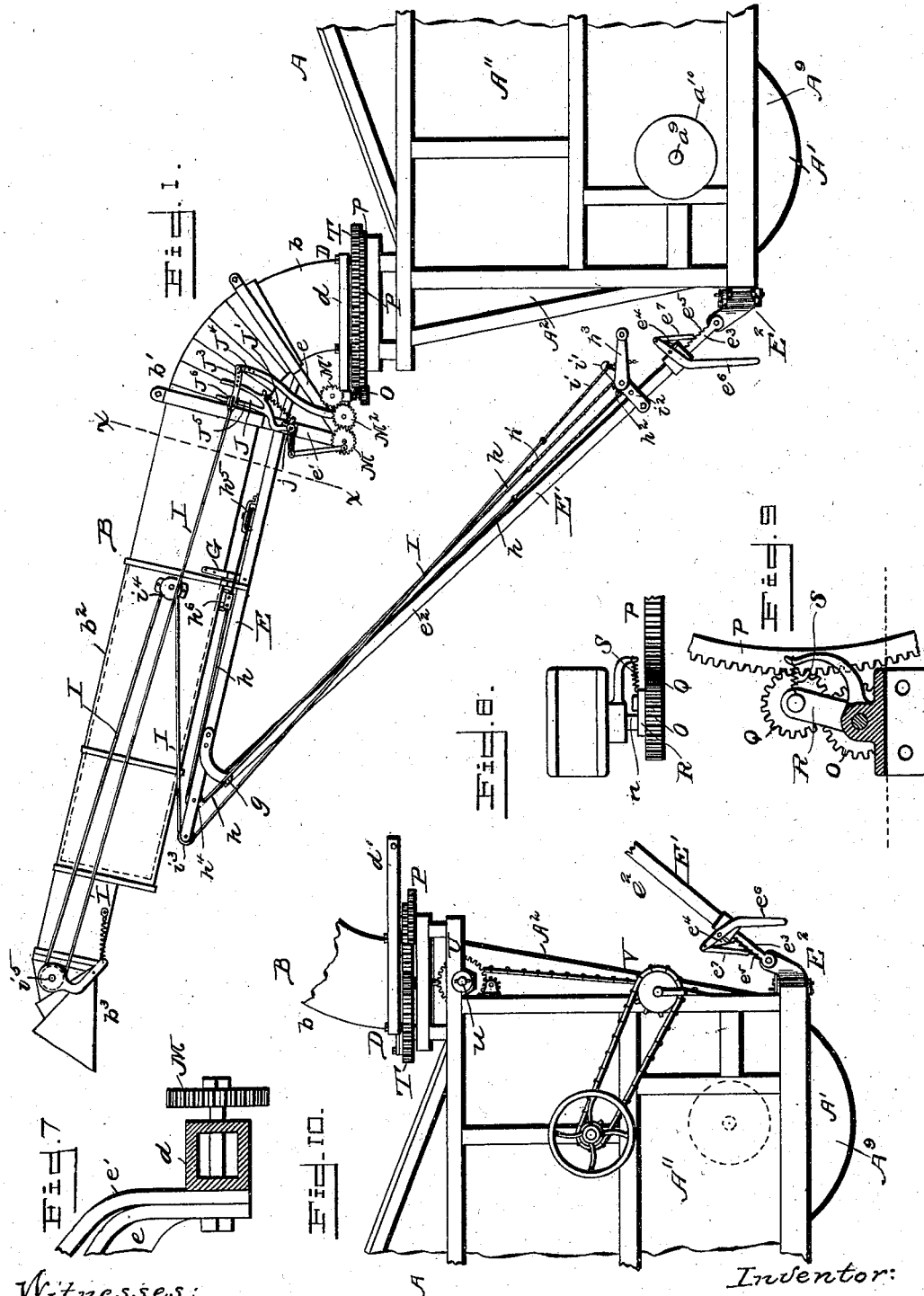
Witnesses:
John Enders, Jr.
Marcus L. Byng.
Inventor:
J. B. Bartholomew,
by H. H. Bliss,
Attorney.

No. 702,766. Patented June 17, 1902.
J. B. BARTHOLOMEW.
PNEUMATIC STACKER.
(Application filed Nov. 19, 1898. Renewed Feb. 14, 1902.)
(No Model.) 5 Sheets—Sheet 2.
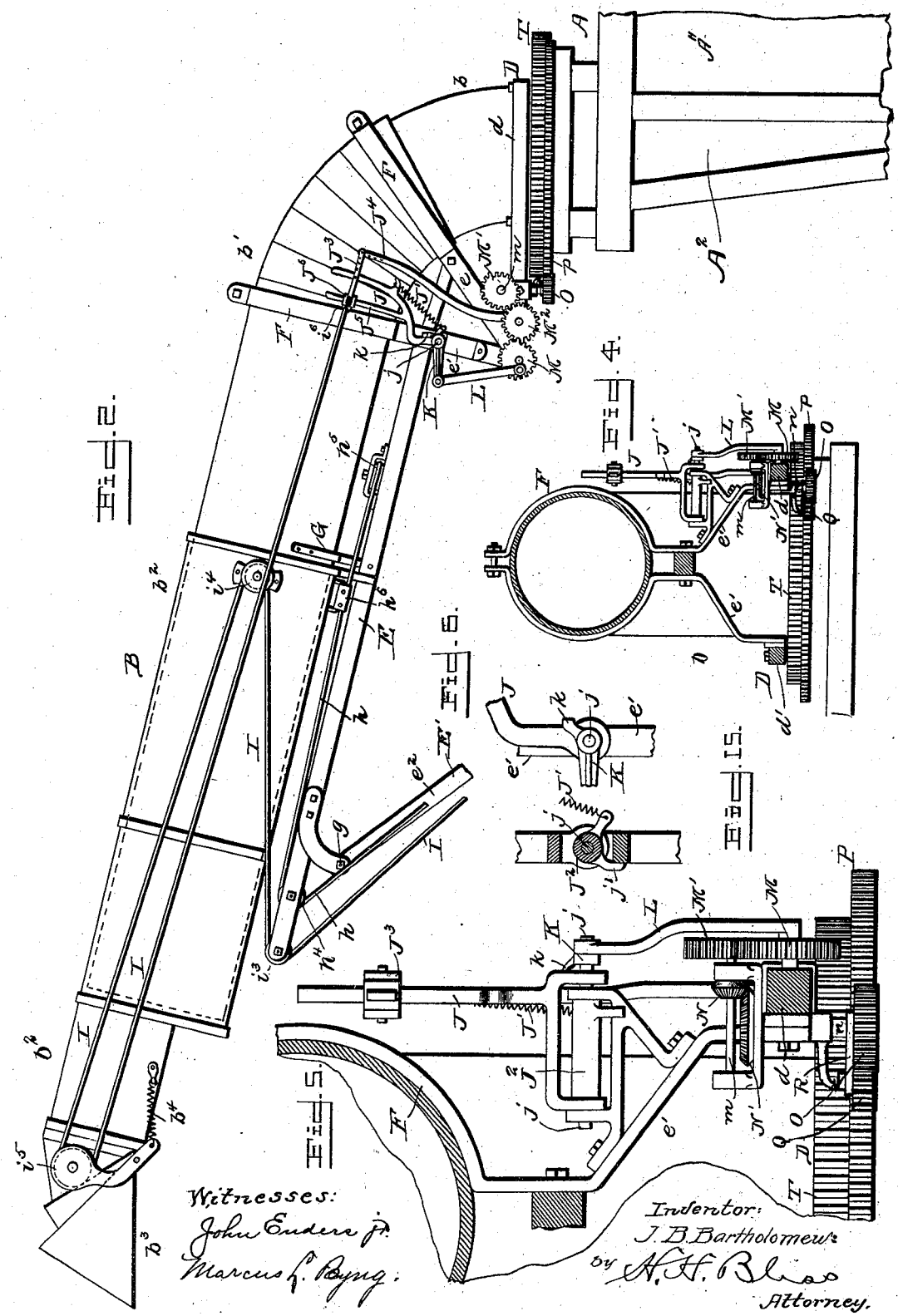

No. 702,766. Patented June 17, 1902.
J. B. BARTHOLOMEW.
PNEUMATIC STACKER.
(Application filed Nov. 19, 1898. Renewed Feb. 14, 1902.)
(No Model.) 5 Sheets—Sheet 3.
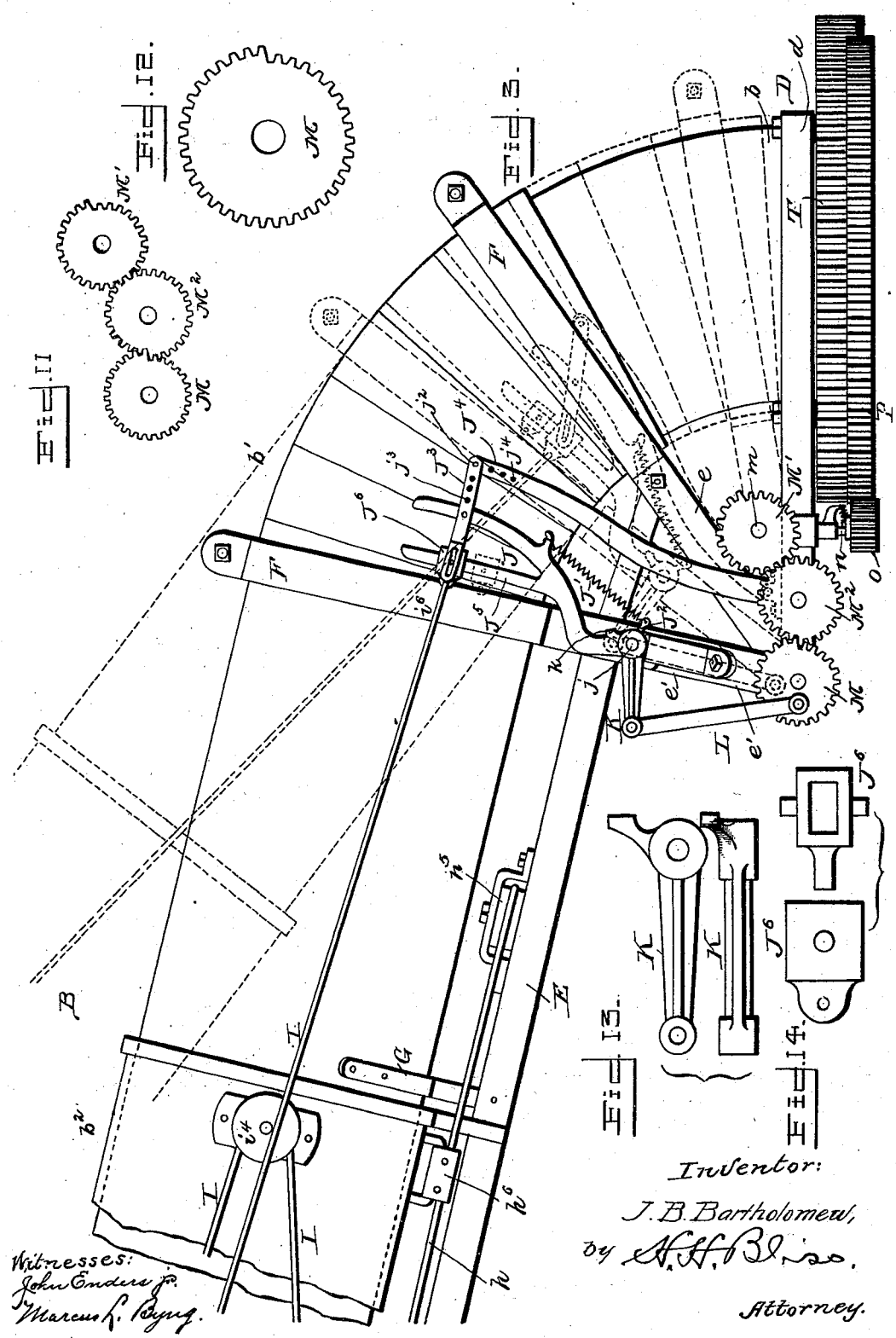
Witnesses:
Inventor:
J. B. Bartholomew,
by A. H. Bliss.
Attorney.

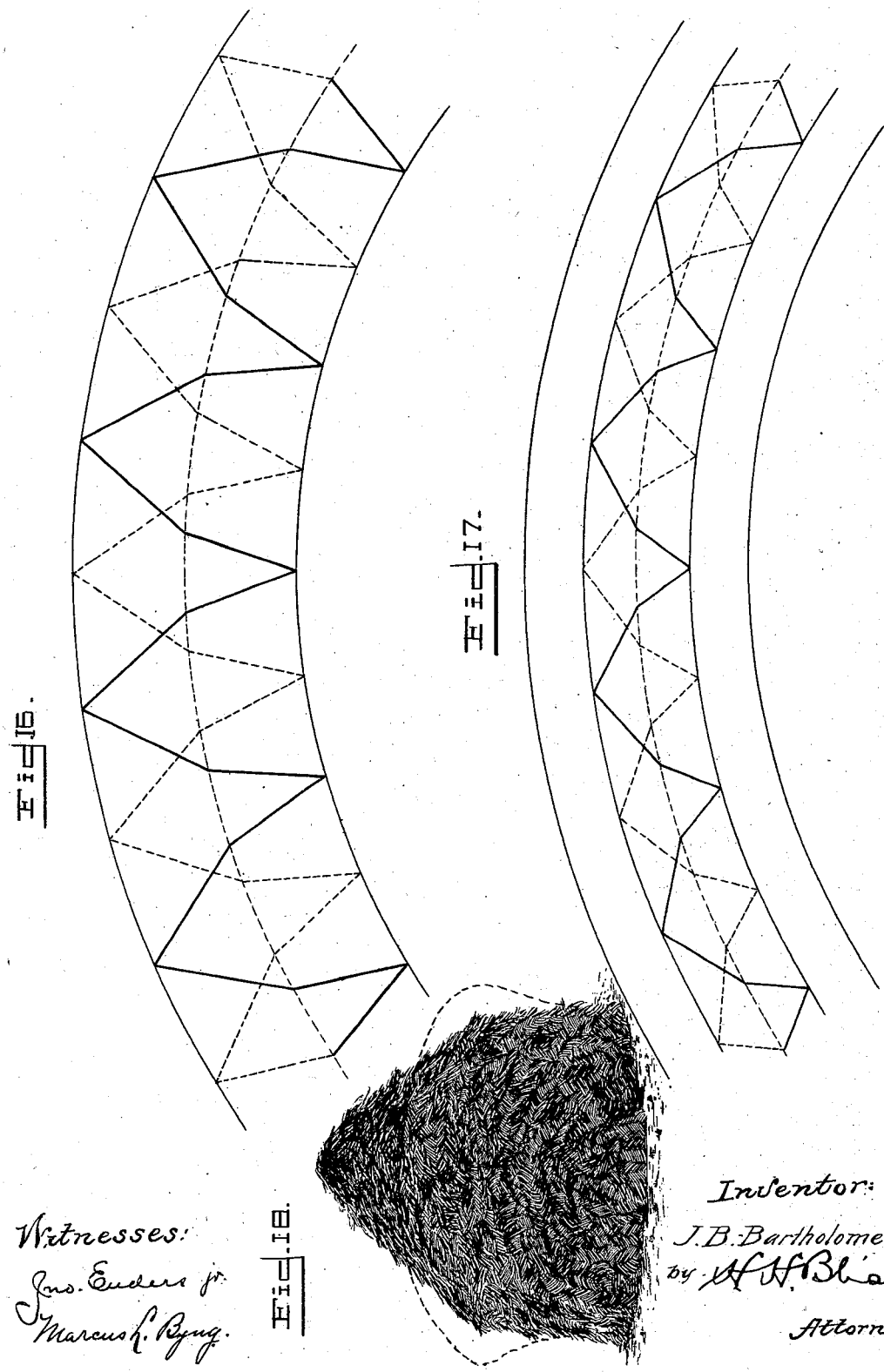

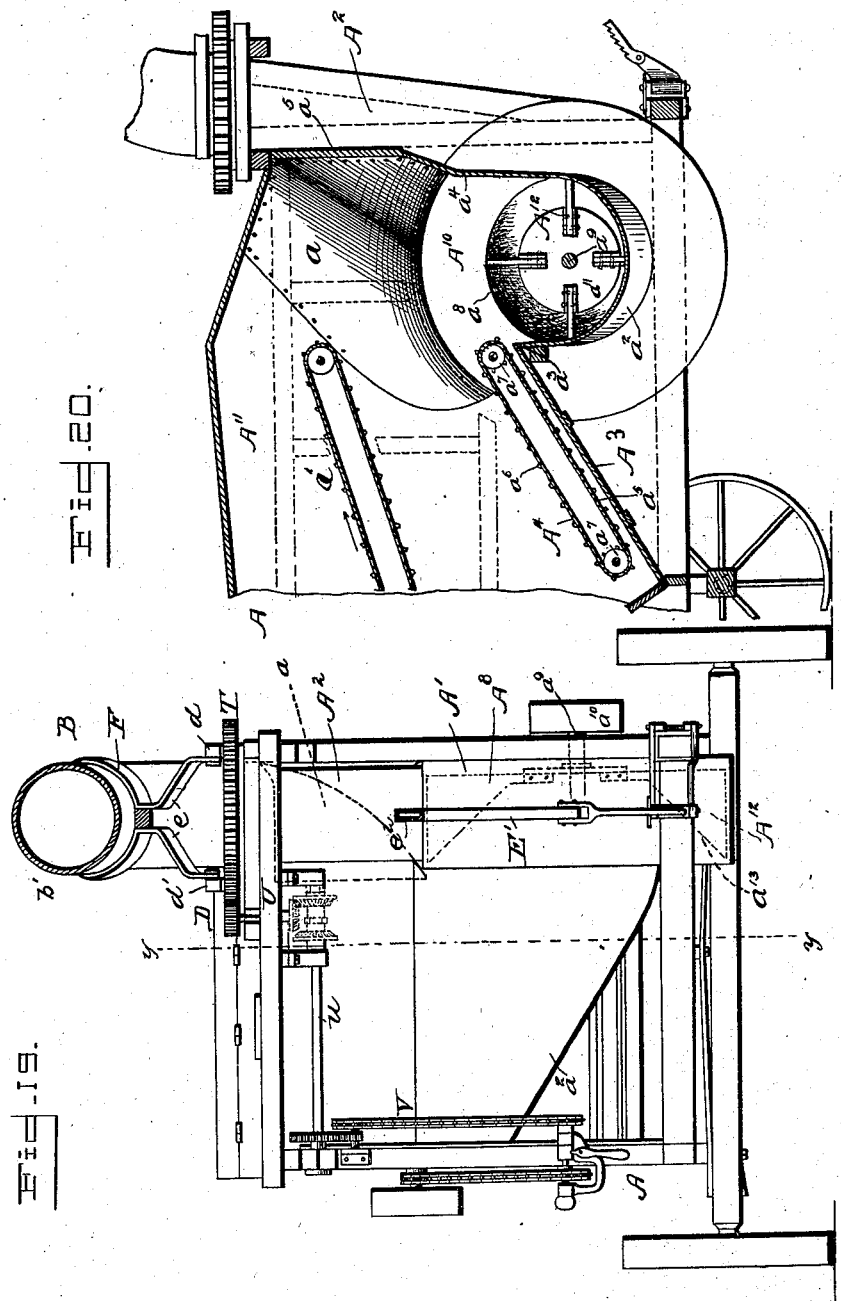

UNITED STATES PATENT OFFICE.

JOHN B. BARTHOLOMEW, OF PEORIA, ILLINOIS, ASSIGNOR, BY MESNE ASSIGNMENTS, TO AVERY MANUFACTURING COMPANY, OF PEORIA, ILLINOIS, A CORPORATION OF ILLINOIS.

PNEUMATIC STACKER.

SPECIFICATION forming part of Letters Patent No. 702,766, dated June 17, 1902.

Application filed November 19, 1898. Renewed February 14, 1902. Serial No. 94,134. (No model.)

*To all whom it may concern:*

Be it known that I, JOHN B. BARTHOLOMEW, a citizen of the United States, residing at Peoria, in the county of Peoria and State of Illinois, have invented certain new and useful Improvements in Pneumatic Stackers; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side elevation of a portion of the threshing and separating mechanism and a side view of the stacker. Fig. 2 is a side view of the stacker on a somewhat larger scale. Fig. 3 is a side view of the parts in the inner end of the stacker-tube for elevating the deflector-hood. Fig. 4 is a vertical section on the line $x$ $x$ of Fig. 1. Fig. 5 is a similar section, on a larger scale, of parts of the devices in Fig. 4. Fig. 6 is a plan view diagrammatically showing the lines on which the straw is delivered from the duct. Figs. 7, 8, and 9 are details. Fig. 10 is an elevation of part of the devices from the opposite side of the thresher. Figs. 11 and 12 illustrate the differential gearing. Figs. 13, 14, 15, and 16 show details. Fig. 17 illustrates, diagrammatically, the lines of straw-delivery near the top of the stacker. Fig. 18 is an end view of a straw-stacker. Fig. 19 is a rear elevation of a thresher. Fig. 20 is a vertical section on the line $y$ $y$, Fig. 19.

In the drawings, A indicates a portion of a threshing and separating mechanism, there being at A' a casing containing an ejector device which receives the straw from the separating mechanism and forces it outward. This consists of a blower or rotary ejector and a peculiarly-shaped chute or hopper for delivering the straw to the ejector, together with an uptake-duct. Upon the framework of the machine and at the upper end of the uptake-duct there is arranged the stacking tube or duct, which is indicated as a whole by B. As shown, it is composed of a tube $b$, which is preferably somewhat curved, an inner adjustable tube-section $b'$, an outer adjustable tube section $b^2$, and a deflector or hood $b^3$. The duct-section $b'$ can be moved along and around the section $b$, and the section $b^2$ can be longitudinally moved or telescoped along the section $b'$. The entire stacker-duct is supported at the inner end by means of the rotary base-frame, indicated by D as a whole, and formed with or carrying suitable bars, as at $d$ $d'$, and at points outside of the inner end it is supported by means of the bars and braces at E E'. The bar or brace E is at its inner end connected to shorter braces $e$ $e'$, which are pivotally fastened to the base-frame bars $d$ $d'$. These brace-bars $e$ $e'$ are connected or formed with rings or half-rings F, which surround and are firmly fastened to the inner section $b'$ of the stacker-duct. The bar or brace E extends from the inner end of the section $b'$ outward to a point below or somewhat outside of the outer end of said part $b'$ and is connected to the downward and inward extending brace-bar E', there being at $g$ a pivot supported by brackets connected to the bar E. The brace E' is composed of two parts, so that its length can be extended. To accomplish this, I prefer to make the upper and outer part $e^2$ of rectangular tubing, in which can be fitted the lower member or bar $e^3$. The two parts $e^2$ $e^3$ are connected by a ratchet-pawl $e^4$, engaging with teeth $e^5$, and by means of a lever $e^6$, operating a pawl $e^7$, the ratchet-teeth can be utilized for moving the upper tubular part $e^2$ upward and outward, so as to elongate the parts as a whole and lift the stacker-duct B or lower it, as desired. The lower end of this brace E' is pivotally connected to the swinging plate E², which is adapted to be locked in either of several positions. At G a pillow-block is interposed between the duct-section $b'$ and the brace-bar E, it being rigidly connected to both and providing a firm support at that point for the stacker-duct. The outer duct-section $b^2$ is capable of sliding inward to this pillow-block and thence outward to a point near or beyond the outer end of the brace-bar E. To effect this, use is made of the device at H, it consisting of a cord $h$, a section of chain $h'$ of suitable length, a sprocket at $h^2$, and a crank $h^3$, (secured to the lower part of the brace E' and accessible to the operator while standing on the ground,) together with guide-sheaves at $h^4$ $h^5$ and the fastening device at $h^6$. This latter part $h^6$ is secured to the inner end of the outer duct-section $b^2$ and is also secured to one strand of the cord or cable $h$. When the operator turns the crank $h^3$ and sprocket $h^2$ in one direction, the sprocket engaging with the chain $h'$ draws it and the cable $h$ in such way as to pull the stacker-tube $b^2$ outward, whereby the stacker-duct as a whole is elongated. When he turns them in the opposite direction, the section $b^2$ is drawn inward.

The deflector or hood $b^3$ is movably connected to the outer end of the telescoping section $b^2$. Preferably it is connected by means of a pivot, so that it can rock or vibrate across (or more or less across) the longitudinal lines of the passage-way through the straw-duct; but it may be arranged in other ways, so as to accomplish the purposes of the invention.

The parts above referred to have been heretofore presented by me in my earlier patents, Nos. 633,559, 633,560, and 633,561, dated September 26, 1899, and therefore I do not regard it necessary to here describe them in detail, they being herein presented in order that a clearer understanding may be obtained of those parts supplemental thereto which constitute my improvements.

The movable deflector or hood $b^3$ has connected to it a cord I. This cord is arranged as follows: One of its ends at $i$ is fastened at a point preferably near the ground—as, for instance, to a hook $i'$ on the bracket $i^2$, which supports the aforesaid sprocket $h^2$. It passes thence upward along the brace-bar E' and over a pulley $i^3$ on the bar E or brace E'. From this pulley it extends upward to pulley $i^4$ on the sliding duct-section $b^2$, thence to the pulley $i^5$ on the deflector or hood $b^3$, and thence backward to the mechanism for vibrating the deflector. The latter in the mechanism shown is constructed as follows:

J is a bar or lever pivoted upon a short shaft or pin $j$, carried by the horizontally-reciprocating frame and preferably on the vertically-adjustable part.

J' is a spring connected at one end to a vibratable bar or collar $J^2$, also pivoted at the axis $j$ and having a stop $j'$, which permits it to move in one direction, but limits it in the opposite direction.

The bar or lever J is connected to another lever or arm $J^3$, to which the cord is attached.

$J^4$ is a governing-link connected, preferably, directly to the lever or arm $J^3$.

K is a lever also pivoted at $j$ and having a short arm $k$, which bears against the bar or lever J; but the levers K and J are separable and each capable of more or less movement independently of the other. When the lever K is moved in one direction, it swings the lever J forward, so as to move the deflector or hood, and after the movement of the lever K ceases the spring at J' moves the lever J in the opposite direction. The lever K is reciprocated by means of a pitman L, which is pivotally connected by a crank-pin to a wheel M. This wheel M is suitably mounted—as, for instance, on the base-frame D. It is driven by a wheel M' either directly or through an idler $M^2$, which latter are also suitably mounted, in the present case mounted on the aforesaid base-frame. The wheel M' is on a shaft $m$, which carries a bevel-wheel N. With the latter meshes a bevel N' on a vertical shaft $n$. At the lower end of this shaft there is a pinion O, which is caused to rotate by a rack-segment P, secured to the machine-frame. The pinion O may engage or mesh directly with the rack P; but as it is somewhat difficult to place the rack perfectly concentric with the axis around which the duct vibrates I prefer to introduce an idler or driving-pinion Q between the pinion O and the rack. This pinion Q is movably mounted on a radius-bar R, pivoted on the axis of the pinion O. This radius-bar R has a spring S connected with it and tending normally to hold the pinion Q in engagement with the stationary rack P; but at the same time the pinion Q can accommodate itself to any irregularities of position of the pitch-line of the rack P relatively to the vertical axis of oscillation.

It will be understood that with the stacker-duct above described there is combined mechanism to automatically effect the horizontal vibration of the duct. This may be of any of the now well-known kinds or of any preferred sort. As shown, the rotary base at D of the duct is provided with a gear-wheel T. With this engages a driving mechanism indicated as a whole by U and containing a reversing device. The driving mechanism at U is actuated by the shaft $u$, which receives power from the parts at V, which in turn are actuated through belting, chain, or gearing from the driving parts of the thresher or separator.

The operation of my improved stacker will be readily understood from the drawings in connection with the above description. When the machine is in operation and straw is being delivered to the duct from the separator by the ejector, the duct having been adjusted to the desired angle by means of the two-part brace E', the duct-rotating mechanism at U, engaging with the toothed ring T, causes the base-frame D and the duct to move first in one direction through a part of a circle and then back in the opposite direction. Thus the straw which is delivered to the duct is by the air-blast carried longitudinally through it and is propelled from the outer end. While the base D is thus moving around a vertical axis and imparting a horizontal movement to the outer end of the duct the pinion O is being rotated by the stationary rack P and is transmitting motion to the wheel M, which in turn, through the pitman L, is vibrating the crank-lever K, and the latter when moving in one direction allows lever J to move the deflector $b^3$ up. While wheel M is making the other half of its revolution and returning the crank-lever L it moves the lever J forward, and the spring $b^4$ draws the deflector or hood $b^3$ downward. Thus at every revolution of wheel M there is a complete reciprocation of the deflector or hood. As many movements of the deflector $b^3$ may be attained for each horizontal reciprocation of the duct as are desired by suitably relating the driving-gear M, M', O, and Q to the rack P.

By referring to Fig. 17 a line of deposit of the straw attainable with this construction will be observed. The parts are preferably so related that while the reciprocating movement of the deflector is relatively slow it will perform each of its movements in different vertical planes when moving to the left horizontally, compared with the vertical planes in which it made its movements when moving to the right. Consequently the straw is uniformly deposited upon the top of the stack, and the piling is evenly made. Heretofore much trouble has been experienced with pneumatic stackers owing to the fact that they delivered the straw in such a way that it was practically impossible to control the shape of the stack, and this has been found so serious a matter as to largely prohibit the use of these mechanisms notwithstanding the advantages which they are recognized as having. With a mechanism of the character described this irregularity in the stacking is entirely overcome, and it is possible to produce a stack of the desired shape and dimensions.

Another important feature is embodied in the present mechanism. Not only is the deflector automatically caused to move, but to move with different speeds through the two halves of its path. The outer circle of the stack being longer than the inner circle, there would be a tendency for the duct to pile more rapidly along the inner circumference than along the outer if the delivery were constant. To overcome this, I vary the speed of the travel of the deflector, so that it moves from the midway point outward more slowly, relatively, than it moves from the midway point to the inner circumference. It will be seen that the gears M M' M² are not circular, but are so formed as to be differential in character—that is to say, the driving-wheel M' during one half of its revolution imparts a relatively fast speed to the wheel M² and a relatively slow speed during the other half of its revolution, and the wheel M² similarly imparts first a high speed and then a slower one to the wheel M, and the faster and slower moving parts of the wheel M are so related to the power-transmitting device between said wheel M and the deflector $b^3$ that the latter shall receive the higher speed when it is moving over the inner half of its in-and-out travel, and vice versa. Consequently a greater volume of straw at each reciprocation of the deflector is placed on the outer half of the stack; but as this is of larger horizontal area the top of the stack is maintained level.

At many times it is desirable to deliver the straw without altering the position of the ejector, as when it is desired to deliver an unusually large amount at some one point or along one line. In such case the reciprocating lever J can be thrown out of action. To do which, it is only necessary for the operator standing on the ground to exert tension upon the rope I sufficient to draw the lever J forward far enough to have it escape engagement with the arm $k$ of crank-lever K. The cord or rope I can be fastened in such position, and the lever J can be held indefinitely out of action. At such times the wheel M, pitman L, and lever K continue with their normal movements, but do not affect the lever J. By having the cord I arranged in the way described several important ends can be attained—that is to say, by having the ends of the cord both secured at points remote from the deflector and arranging the cord so that it engages with and passes around a pulley or sheave connected to the deflector. Heretofore it has generally been common to connect the cord rigidly to the deflector. By having the parts constructed and arranged as herein shown I am enabled, first, to apply the draft force upon the deflector with greater efficiency, because of the pulley connected thereto and having the rope run around it, this pulley moving forward and back with the deflector; second, to telescope or slide the outer section $b^2$ out or in without varying the relative length of the cord I, the relations of the pulleys $i^3$ $i^4$ $i^5$, the lever J, and the duct-sections being such that as one end of the cord becomes relatively shorter the other becomes relatively longer, but the same total length is maintained, and third, to apply the vibrating force to the deflector readily by automatically-acting devices.

On examination of the drawings it will be seen that I relate in a peculiar manner the several moving parts of the deflector-vibrating mechanism to the several axes around which the duct vibrates. Thus the wheel M' is mounted on the axis at $m$, upon which occurs the vertical vibration or adjustment of the duct when the outer end is put at a higher or lower position, and, further, by having all of the parts which support the cord connected to or carried by one part or another of the framework, which vibrates around the vertical axis of the duct, I can maintain the same relative lengths of the cord at all times. The mechanism which I have shown—such as the levers J and K, pitman L, or wheels M, M', M², O, and Q—may be considered as made up of two members or parts, one of which can be separated from the other for the purpose of being put out of action, while the other continues normally moving; and, again, the mechanism for moving the deflector may be regarded as made up of a train of parts constituting two members—for instance, one including the levers J and K and the pitman L, while the other includes the wheels M M' M², &c.—one of which members is stationary relatively to the vertically-adjustable duct and one of which is movable therewith. The parts at J J³ J⁴ are such that they will cause a variation of the arc through which swings the point of attachment of the cord at $i^6$ to the lever—that is to say, when the outer end of the duct is in its lower position the deflector will be caused to move over a longer path or swing through longer arcs; but when said outer end is in its upper position the deflector will move through shorter arcs or paths. It will be seen that when the duct is in its lower position the bar $e$ is at a greater angle to the rotary base and the arm at $d$ than it is when it is in its upper position—that is to say, the bar $e$ swings toward and from the bar D. When the duct is in its lower position, (and the bar $e$ is nearer upright,) the link J⁴ is drawn into such a position as to throw the point of attachment of the cord at $i^6$ relatively farther from the pivot at $j$, and this point, therefore, will vibrate through a long arc, and consequently the cord will cause the deflector to move through a correspondingly long path; but when the duct is lifted up and is operating in its higher position at the outer end the bar $e$ is carried toward the bar D, the angle between them becomes less, and the link J⁴ takes such position as to bring the point of attachment at $i^6$ nearer to the pivot at $j$, and its arc or swing around the pivot is much shortened and the travel of the deflector is proportionately less. In brief, I not only provide a mechanism by which the deflector can be caused to move around a longer path or a shorter one, but further provide for this adjustment being accomplished automatically, the parts setting themselves as the duct is taken from that position where more play of the deflector is desired to one where less play is needed. With the parts thus arranged no attention or manual labor is required for the producing of a stack of the desired shape.

When dealing with some materials, it is desirable to produce a stack which shall have front and rear sides tapering uniformly from the ground to the top. To produce such a pile with the machine here shown it is merely necessary to draw, as above described, upon the end of the cord I sufficiently to move the lever J forward out of the path of the lever K and so secure it; but in many cases it is desirable to form the stack of other shapes— for instance, with sides extending a distance from the ground on lines approximately vertical and then produce an upper portion with rapidly sloping or rounded top surface. This can be accomplished by adjusting or setting the several parts described in the mechanism herein. The connecting-pin at $j^2$ between the link J⁴ and the lever or arm J³ can be inserted in one or another of a series of apertures $j^3$ in the bar J³ or one of those at $j^4$ in the link J⁴, and a wide series of variations in the play of the deflector and in the form of the stack can be reached.

In Figs. 19 and 20 I have shown that construction and arrangement of the parts which I at present employ for receiving straw from the thresher and ejecting it through the above-described duct. The casing at $A^{11}$ has an inwardly-sloping straw guide or chute $a$ at one side which turns the straw that drops from one side of the straw-carrier $a'$ inward or toward the central longitudinal line of the machine, and at that side of the casing is placed the ejector or fan $A^{12}$. A downward and laterally-inclined chute or bottom $a^2$ extends from the mouth of the fan to the opposite wall of the casing. Looked at in longitudinal section this bottom wall $a^2$ is concave, the short vertical part $a^3$ terminating at the line where the chaff and refuse are received from the winnowing-fan and the rear wall $a^4$ curving or extending upward until it reaches the rear vertical wall $a^5$ of the general casing. These curved walls constitute a straw and chaff receptacle into which the straw drops, some directly from the straw-carrier $a'$ and some from the intermediate guide $a$. From this straw and chaff readily and instantly are drawn by the air-blast and slide down and into the eye of the ejector. Immediately behind the winnowing mechanism at $A^5$ there is a chaff-board $A^3$, upon which there is a scraping-elevator $A^4$, consisting of chains $a^5$ and scraping-bars $a^6$, mounted on the wheels $a^7$ above the board $A^3$. These carry the tailings from the winnower upward and drop them downward into the straw-receptacle. The ejector consists of the fan-like device $A^{12}$ and the casing $A'$. The latter has a cylindrical periphery $A^8$, a continuous wall $A^9$, and an annular wall $A^{10}$, with an eye-aperture $a^8$. The rotary parts are connected to the shaft $a^9$, which extends through the wall $A^9$ and which carries a driving-pulley $a^{10}$ on the outside of the casing. To the shaft there is secured the spider having the arms $a^{11}$, to which are secured the blades $a^{12}$. Each blade is at its inner end cut away, as shown at $a^{13}$. The spider is as close as possible to the outer casing-wall $A^4$ and the cut-away edges $a^{13}$, inclined toward the shaft and toward the outer wall. This provides a large opening or unobstructed passage at the center of the fan, so that the straw can be readily and rapidly drawn in from the receptacle at $a^2$ and forced through the stationary uptake-duct at $A^2$.

Of course it will be seen that many modifications can be made with respect to the parts constituting the essential features of the present invention, and I therefore do not limit myself to exactly the mechanical parts which I have herein chosen for illustration. For instance, it will be seen that instead of the cord I, with all of the advantages of arrangement and attachment which I have shown and described, and instead of the spring $b^4$ use may be made of a stiff rod connected to the deflector and to the levers at J J³ or other and preferred mechanism for vibrating the deflector, suitable provision being made for lengthening or shortening such rod for allowing the telescoping of the duct. So, too, there are numerous ways well known to mechanics for securing differential speeds in moving mechanical parts, and any one of which is suitable may be substituted for the scroll-gearing at M M' M² for varying the speed of the deflector as it moves through one-half of its path in comparison with that while moving through the other half.

What I claim is—

1. In a pneumatic stacker the combination with the straw-ejecting mechanism and the duct, of a deflector for the outer end of the duct, a power device for automatically moving the deflector relatively to the duct, and means for automatically varying the path of the deflector, substantially as set forth.

2. In a pneumatic stacker the combination with the straw-ejector and the straw-duct, of a deflector movable relative to the duct, power devices for simultaneously moving the duct and moving the deflector relatively to the duct, and means for varying the path of the deflector simultaneously with its movements, substantially as set forth.

3. In a pneumatic stacker the combination with the straw-ejector and the straw-duct, of power devices for horizontally rotating the straw-duct, the deflector movable relatively to the duct, power devices connected to the duct for moving the deflector relatively to the duct, and means for automatically varying the path through which the deflector is moved by the last said power devices, substantially as set forth.

4. In a pneumatic stacker the combination with the straw-ejector and the rotary base, of the straw-duct mounted on such rotary base, means for horizontally vibrating the said duct, the adjustable deflector, means for permanently adjusting the deflector, power devices supported upon the rotary base for moving the deflector relatively to the duct, and means for automatically varying the path of the deflector after such permanent adjustment, substantially as set forth.

5. In a pneumatic stacker, the combination with the straw-ejector and straw-duct, of means for horizontally vibrating the straw-duct, the movable deflector, and automatically-actuated power devices adapted to impart a fast movement and a slow movement to the deflector substantially as set forth.

6. In a pneumatic stacker the combination with the straw-ejector and the straw-duct, of the deflector at the outer end of the straw-duct, automatically-actuated means for moving the deflector with a relatively fast speed and automatically-actuated means for moving it with a relatively slow speed relatively to the duct, substantially as set forth.

7. In a pneumatic stacker the combination with the straw-ejector, the straw-duct, and the means for horizontally vibrating the straw-duct, of a movable deflector and a two-part power device for moving the deflector relatively to the duct, the two parts of which while in position can be held apart whereby one part may be made stationary while the other remains normally in motion, substantially as set forth.

8. In a pneumatic stacker the combination of the straw-ejector, the straw-duct, the means for horizontally vibrating the straw-duct, a deflector at the outer end of the duct, a two-part power device for moving the deflector and means for throwing one part of the power device out of action while the other part is in motion, substantially as set forth.

9. In a pneumatic stacker the combination with the straw-ejector, the straw-duct, and the means for horizontally vibrating the duct of the movable deflector, the pivotal lever, differential gear-wheels, means connecting such gear-wheels with the lever, and means connecting the lever with the deflector, substantially as set forth.

10. In a straw-stacker the combination with the duct for air and straw and the deflector movably supported at the outer end of the duct, of a cord having its two ends fixed independently of the deflector, and having the part intermediate of its ends engaging with a cord-guide on the deflector, and an automatically-adjustable support for one end of such cord whereby the path of movement of the deflector may be automatically caused to vary, substantially as set forth.

11. In a straw-stacker the combination with the duct for the passage of air and straw and the deflector movably supported at the outer end of said duct, of the cord connected to the deflector and attached to a movable cord-holder, and means for automatically adjusting the position of the cord-holder to vary the movement of the deflector, substantially as set forth.

12. In a straw-stacker the combination of the duct for air and straw, the deflector movably supported at the outer end of the duct, a vibrating cord-holder and means for varying the path of travel of the cord-holder, for varying the travel of the deflector, substantially as set forth.

13. In a pneumatic stacker the combination of the duct for air and straw, the deflector movably connected to the duct, a cord connected to the deflector, a vibrating cord-holder, means for automatically vibrating the cord-holder and means for adjusting vertically the duct and simultaneously adjusting the position of the vibrating cord-holder, substantially as set forth.

14. In a straw-stacker the combination of the duct for air and straw, the deflector movably supported across the path of the straw, the cord connected to the deflector and having one part connected to an automatically-moving and adjustable cord-holder and another part detachably connected to a supplemental holder adapted to permit adjustment of the cord by hand, substantially as set forth.

15. In a straw-stacker the combination of the duct for air and straw, a vertically-swinging support for said duct, a deflector movably supported in the path of the straw, a deflector-moving device, power mechanism for actuating the deflector-moving device and means for automatically varying the path of the deflector-moving device in correspondence with the vertical adjustments of the straw-ducts, substantially as set forth.

16. In a straw-stacker the combination with the duct for air and straw, the deflector movably supported in the path of the straw and means for adjusting the duct to different positions vertically, the means for automatically moving the deflector across the path of the straw and means actuated by the duct-adjusting devices for varying the path of the deflector, substantially as set forth.

17. In a straw-stacker the combination with the thresher and separating mechanism, the straw-ejecting mechanism, the duct for the straw communicating with the ejector at a relatively high point, devices accessible from the ground for adjusting the duct vertically, the deflector movably supported across the path of the straw, means for automatically moving the deflector across said path and means actuated by the duct-adjusting device for varying the path of travel of the deflector, substantially as described.

18. The combination with the separating mechanism and its casing, of the straw-ejector arranged inside of but adjacent to one side of said casing, the straw and chaff receptacle extending from the ejector to the opposite casing-wall and having the downwardly-inclined bottom extending from the last said wall to the eye of the ejector and the upwardly-acting conveyer arranged to carry the chaff from the winnower upward to the said receptacle, and the supplemental conveyer for the straw arranged to deliver it to the said receptacle, substantially as set forth.

19. In a stacking mechanism, the combination of the rotary base, the stacking devices mounted thereon, rotating devices engaging with the base, a clutch for reversing the rotating mechanism, power devices for actuating the rotating mechanism and the clutch hand devices for actuating the rotating mechanism and the clutch, and a supplemental clutch interposed between the rotating devices and hand devices, substantially as set forth.

20. The combination of the duct, a deflector for the outer end of the duct, a power device at the forward or inner end of the duct for automatically moving the deflector relatively to the duct, and automatically-acting means for varying the path of the deflector.

21. The combination of the extensible duct, a deflector for the outer end of the duct, a power device at the forward or inner end of the duct for automatically moving the deflector relatively to the duct, and means for varying the path of the deflector acting irrespective of the extension or retraction of the duct.

22. The combination of the duct, a deflector for the outer end of the duct, an inwardly and outwardly moving part, means for actuating the same, a cord connecting the deflector with said movable part, and means for automatically varying the operative length of the movement of said part.

23. The combination of the duct, a deflector for the outer end of the duct, an inwardly and outwardly movable arm, means for actuating the same, a cord connecting the deflector with said movable arm, and means for varying the operative length of said arm.

In testimony whereof I affix my signature in presence of two witnesses.

JOHN B. BARTHOLOMEW.

Witnesses:
C. R. HOLZMAN,
O. S. BLOCK.